(12) United States Patent
Schmidt et al.

(10) Patent No.: US 11,864,171 B2
(45) Date of Patent: Jan. 2, 2024

(54) COORDINATION OF LOGICAL CHANNEL PRIORITIES

(71) Applicant: IPCom GmbH & Co. KG, Pullach (DE)

(72) Inventors: Andreas Schmidt, Braunschweig (DE); Achim Luft, Braunschweig (DE); Maik Bienas, Schöppenstedt (DE); Martin Hans, Bad Salzdetfurth (DE)

(73) Assignee: IPCom GmbH & Co. KG, Pullach (DE)

( * ) Notice: Subject to any disclaimer, the term of this patent is extended or adjusted under 35 U.S.C. 154(b) by 318 days.

(21) Appl. No.: 17/436,657

(22) PCT Filed: Mar. 18, 2020

(86) PCT No.: PCT/EP2020/057489
§ 371 (c)(1),
(2) Date: Sep. 7, 2021

(87) PCT Pub. No.: WO2020/187997
PCT Pub. Date: Sep. 24, 2020

(65) Prior Publication Data
US 2022/0191886 A1     Jun. 16, 2022

(30) Foreign Application Priority Data
Mar. 20, 2019  (EP) .................................. 19163987

(51) Int. Cl.
*H04W 36/00*     (2009.01)
*H04L 1/00*      (2006.01)
(Continued)

(52) U.S. Cl.
CPC ... *H04W 72/1215* (2013.01); *H04W 28/0278* (2013.01); *H04W 72/1263* (2013.01); *H04W 88/06* (2013.01)

(58) Field of Classification Search
None
See application file for complete search history.

(56) References Cited

U.S. PATENT DOCUMENTS 7,769,926 B2 * 8/2010 Wu ................. H04W 72/21
                                                   370/335
8,804,616 B2 * 8/2014 Grant .................. H04W 76/16
                                                   455/434
(Continued)

FOREIGN PATENT DOCUMENTS

EP      2723144 A1    4/2014

*Primary Examiner* — Tuan A Tran
(74) *Attorney, Agent, or Firm* — PROI Intellectual Property US; Klaus Michael Schmid

(57) ABSTRACT

The present invention provides a method of transmitting data to a receiving entity, the method comprising establishing a plurality of transmission channels to the receiving entity, the transmission channels being established using more than one radio access technology; for each transmission channel determining a buffer status of a data buffer containing data to be transmitted using that transmission channel; and determining if transmission capacity is available in a packet data unit of a first radio access technology and if such transmission capacity is available determining whether data may be taken from a data buffer of a transmission channel of a second radio access technology and transmitted to the receiving entity in the packet data unit.

20 Claims, 8 Drawing Sheets

(51) Int. Cl.
  *H04L 1/16*      (2023.01)
  *H04L 1/18*      (2023.01)
  *H04L 12/26*     (2006.01)
  *H04W 72/12*     (2023.01)
  *H04W 28/02*     (2009.01)
  *H04W 72/1263*   (2023.01)
  *H04W 88/06*     (2009.01)

(56) References Cited

U.S. PATENT DOCUMENTS

| | | | | |
|---|---|---|---|---|
| 9,271,290 | B2* | 2/2016 | Pelletier | H04W 88/06 |
| 9,628,588 | B2* | 4/2017 | Jonsson | H04L 69/22 |
| 9,942,898 | B2 | 4/2018 | Dinan | |
| 9,955,388 | B2* | 4/2018 | Jung | H04L 1/1848 |
| 10,728,825 | B2* | 7/2020 | Jung | H04L 5/0048 |
| 11,233,725 | B2* | 1/2022 | Zhang | H04L 47/34 |
| 11,516,700 | B2* | 11/2022 | Kim | H04W 28/0278 |
| 11,601,860 | B2* | 3/2023 | Jung | H04W 36/0094 |
| 11,695,515 | B2* | 7/2023 | Chai | H04W 76/28 |
| | | | | 370/329 |
| 11,716,781 | B2* | 8/2023 | Pelletier | H04W 72/1268 |
| | | | | 370/329 |
| 2012/0140743 | A1 | 6/2012 | Pelletier et al. | |
| 2013/0322275 | A1* | 12/2013 | Comeau | H04W 36/165 |
| | | | | 370/252 |
| 2017/0353972 | A1 | 12/2017 | Babaei et al. | |
| 2018/0139646 | A1 | 5/2018 | Basu Mallick et al. | |
| 2018/0146398 | A1 | 5/2018 | Kim et al. | |
| 2018/0270700 | A1 | 9/2018 | Babaei et al. | |

\* cited by examiner

COORDINATION OF LOGICAL CHANNEL PRIORITIES

The present invention relates to sharing transmission resources in a mobile communications system.

As part of the ongoing work on Release 15 (also known as Rel-15), 3GPP is currently in the process of finalizing a new wireless communication system referred to as 5G (fifth generation). It is deemed to be the successor technology of 4G LTE. This endeavour comprises work on a new radio access network (RAN) including a new air interface termed "5G NR" as well as work on a new core network (CN) architecture which is referred to as "5G CN".

A first intermediate milestone to serve a particular 5G use case, namely the enhanced Mobile Broadband (eMBB) use case, was completed in December 2017 ("early drop"). This non-standalone (NSA) variant of "5G" complements the established air interface and core network technologies defined for 4G LTE with a second air interface (5G NR) offering improved performance, more flexibility, finer scalability and more efficiency across a wide variety of spectrum bands. In NSA, the LTE base station (eNB) is acting as a master node and the NR base station (gNB) is acting as a secondary node in a multi-connectivity mode termed "EN-DC".

The second milestone does not require this LTE assistance anymore. The standalone (SA) variant of the 5G wireless communication system was completed in June 2018 and implies full user plane and control plane capability using the new 5G core network architecture. Thus, in contrast to NSA, it can be deployed independently from LTE.

One design goal for the 5G wireless communication system in 3GPP Rel-15 was to ensure commonality between the two variants NSA and SA, so that new capabilities and features can be introduced in subsequent releases of the standard.

3GPP also decided to work on a third milestone of the 5G wireless communication system using the new 5G core network architecture. The objective for this initiative is to realize more architecture options, for example, the possibility to operate NR and LTE in multi-connectivity mode wherein NR is the master node and LTE is the secondary node (termed "NE-DC"), or dual connectivity (DC) between two 5G NR base stations. This "late drop" is scheduled to be finalized by end of 2018.

The DC concept as such is not new in cellular networks. In its simplest form, it allows two base stations to simultaneously deliver user data to a mobile device (UE). DC between LTE base stations (LTE-DC) was introduced in 3GPP Rel-12 (completed in March 2015) and DC-like aggregation of LTE and WLAN was introduced in 3GPP Rel-13 (completed in March 2016). However, 3GPP Rel-15 is the first time when a DC scenario is being enabled for two different generations of 3GPP radio access technologies (RATs), namely 4G LTE and 5G NR.

The NSA variant of the 5G wireless communication system makes use of LTE-NR Dual Connectivity (so called "EN-DC"). A simplified example for this variant is shown in FIG. 1.

In EN-DC, the master node (MN) is LTE, and the secondary node (SN) is NR. In the user plane that carries the users' data the MN has and the SN may have a direct interface with the established 4G core network (aka Evolved Packet Core, EPC) via the S1 interface, but in the control plane that carries the signalling traffic only the MN has a direct connection towards the EPC. Thus, it is the LTE node that is responsible for maintaining the connection state transitions, handling the connection setup/release, and initiating the first-time secondary node addition (i.e. the EN-DC setup).

Furthermore, in EN-DC, a mobile device (UE) has a second radio resource control (RRC) termination at the secondary node, unlike Rel-12 LTE-DC (DC between LTE base stations) where there is only one RRC termination point at the master node. The separation of LTE RRC and NR RRC termination points enables the secondary node, depending on network configuration, to trigger intra-NR mobility. That means, the SN is enabled to initiate secondary node change/release/modification. In Rel-12 LTE-DC, only the master node was able to do so.

All DC variants for Rel-15 have in common that bearers—if configured as split bearers—are split at the lower end of the packet data convergence protocol, PDCP, layer. FIG. 1 gives a (simplified user plane) representation of an EN-DC configuration (as defined in the NSA variant of Rel-15) with two direct bearers (an MCG bearer on the left going completely through the protocol stack of the MN and an SCG bearer on the right going completely through the protocol stack of the SN) and one bearer that is split at (the lower end of) the PDCP layer in the MN. More sophisticated bearer configurations are possible and are for example described in section 4.2 of TS 37.340.

The interface X2 between the base stations may be used to exchange control plane signalling and user plane traffic (in form of PDCP protocol data units, PDUs) between the MN and the SN (and vice versa). Through the X2 interface a base station (e.g., MN) can also request its peer base station (e.g., SN) to provide radio resources for a certain UE according to its own traffic load condition. More details on the various dual connectivity architecture options described above can be found in 3GPP TR 38.801 and 3GPP TS 37.340.

The advantage of performing the bearer split/aggregation at PDCP level is the low constraint in terms of synchronicity between NR and E-UTRAN and the low implementation complexity. The various multi-connectivity variants therefore show their benefit in deployment scenarios where synchronicity of the involved base stations cannot be guaranteed because of a suboptimal backhaul link between the respective nodes.

As indicated in FIG. 1, a bearer split at one end always comes together with some sort of bearer aggregation at the other end. For instance, if a DL bearer is split on the infrastructure side (either in the MN or SN) then the two paths of the bearer have to be aggregated at the receiving UE. Likewise, if an UL bearer is split in a UE then the two paths of the bearer have to be aggregated on the infrastructure side (either in the MN or SN). The term "split bearer" is commonly used in 3GPP.

The base station is responsible for QoS management. In order to fulfil this responsibility, the base station needs ongoing information from the UE. This in turn requires a way for the UE to report to the base station which radio bearers (RBs) need uplink resources and how much resources they need. The base station can then schedule the UE based on the QoS characteristic of the corresponding RBs and the reported buffer status level.

Keeping the base station informed of the status of a large number of RBs will require a considerable signalling overhead. To avoid this, 4G LTE and 5G NR standards include the concept of a logical channel group (LCG). LCGs are basically a signalling reduction mechanism to allocate RBs to one of four groups (in 4G LTE) and eight groups (in 5G NR), respectively. The mapping of RBs (or, logical channels) to a LCG is done in course of the radio bearer setup procedure by the base station and based on the corresponding quality of service (QoS) attributes of the RBs, such as QoS class identifier (QCI).

The concept of LCGs has an impact on the UE buffer status reports which still need to keep the base station informed as much as possible. The UE reports an aggregated buffer status for the combination of RBs that are assigned to an LCG. The base station knows which RBs are contained in a respective LCG and their priorities. Although the base station may not have the status on an individual RB— provided that the QoS requirements for multiple RBs within an LCG are similar—it can schedule the UE in a fair and appropriate fashion.

In order to realize a decent UL QoS management, wireless communication systems, such as 4G LTE and 5G NR, offer a reporting functionality at their media access control, MAC, layers of the protocol stack called buffer status reporting by sending a buffer status report, BSR. A BSR allows a UE to transmit information to its serving base station on how much data is waiting in the UE's uplink buffers to be sent out. This signalling method is realized at MAC layer by means of MAC control elements (CEs). The base station would then allocate radio resources on the physical uplink shared channel (PUSCH) for the UE (if resources are available on that channel) via UL grant signalling in downlink direction. With this mechanism, the network can optimize its UL resources based on following logics:

Allocate UL resources (via UL grant) only when UE has something to transmit, and Avoid allocating too much UL resources (more than what the UE currently needs).

Details of BSR are described in 3GPP TS 36.321 (for 4G LTE) and 3GPP TS 38.321 (for 5G NR).

In terms of data structure of MAC CEs for BSRs, there are two different types (4G LTE) and four different types (5G NR), respectively. With the short BSR MAC CE, the UE can indicate the amount of data in the UL buffer for one specific Logical Channel Group (LCG). With the long BSR MAC CE, the UE can send the UL buffer information for all LCG to the base station.

In terms of reporting, there are three categories according to the timing used by the UE to send its BSR messages: regular BSR, periodic BSR, and padding BSR. A regular BSR is transmitted whenever new data arrives in the UE's uplink buffer and the new data has higher priority than the one already waiting in the buffer. A periodic BSR is sent with a predefined reporting periodicity which is defined by the network and signalled to the UE at RRC layer (e.g, contained in the RadioResourceConfigDedicated information element (IE) in the RRC connection reconfiguration message). A padding BSR is sent when the number of padding bits in a MAC PDU is larger than the size of a BSR (MAC CE for BSR plus sub header), so that the padding bit space can be filled up with BSR information.

Today's BSR transmission is RAT specific, that means there is currently no interworking at MAC layer between 4G LTE and 5G NR with respect to buffer level reporting and/or MAC PDU assembly. Furthermore, the "buffer size" field in the MAC CEs identifies the total amount of data available across all logical channels of a given LCG after all MAC PDUs for a given transmit time interval (TTI) have been built.

There is no direct relationship between the BSRs sent by the UE and how it processes a grant received from the base station. Resource grants are allocated by the UE to radio bearers on a logical channel priority basis. Membership in a particular LCG is not relevant. For example, let's say a UE requests resources for LCG 2 in order to send a HTTP request. Before the grant was received an RRC message becomes ready to be sent. Then when the grant is received the RRC message gets priority and uses up as much of the resource as it needs. The HTTP request will get the leftovers, if any. Usually, RRC messages are sent on SRBs which are assigned to LCG 0 by default.

There are some fundamental differences in the structure for PDU generation at MAC level between 4G LTE and 5G NR.

In 4G LTE, a MAC PDU consists of a MAC header, zero or more MAC service data units (MAC SDU), zero or more MAC control elements (CEs), and optionally padding.

Both the MAC header and the MAC SDUs are of variable sizes. A MAC PDU header consists of one or more MAC PDU subheaders, and each subheader corresponds to either a MAC SDU, a MAC control element or padding. More details about how a MAC PDU frame is structured for 4G LTE can be found in 3GPP TS 36.321.

A MAC PDU subheader consists of the five or six header fields R/F2/E/LCID/(F)/L but for the last subheader in the MAC PDU and for fixed sized MAC control elements. The last subheader in the MAC PDU and subheaders for fixed sized MAC control elements consist solely of the four header fields R/F2/E/LCID. A MAC PDU subheader corresponding to padding consists of the four header fields R/F2/E/LCID.

In 5G NR, a MAC PDU consists of one or more MAC subPDUs, and each MAC subPDU consists of one of the following:

A MAC subheader only (including padding);
A MAC subheader and a MAC SDU;
A MAC subheader and a MAC CE;
A MAC subheader and padding.

The MAC SDUs are of variable sizes. Each MAC subheader corresponds to either a MAC SDU, a MAC CE, or padding. All MAC CEs are placed together. However, the order of MAC subPDUs is different in uplink and downlink:

For the downlink, MAC subPDUs with MAC CEs are placed before any MAC subPDU with MAC SDU and MAC subPDU with padding. For the uplink, MAC subPDUs with MAC CEs are placed after all the MAC subPDUs with MAC SDUs and before the MAC subPDU with padding in the MAC PDU while the size of padding can be zero in some cases. More details about how a MAC PDU frame is structured for 5G NR can be found in 3GPP TS 38.321.

While the focus of this introduction is directed to 4G LTE, the same principles also apply for 5G NR. As such, the 4G LTE terminology used here is not meant to be understood in a restrictive manner.

For the uplink, the process by which a UE creates a MAC PDU to transmit using the allocated radio resources is fully standardized in order to ensure that the UE satisfies the QoS of each configured RB in a way which is optimal and consistent between different UE implementations. The logical channel prioritization procedure is applied when a new transmission is performed: Based on the UL Grant received via the physical downlink control channel (PDCCH) the UE has to decide on the amount of data for each logical channel to be included in the new MAC PDU under construction (thereby taking also sufficient space for MAC CEs into account).

The various RBs (or, logical channels) are served in order of their priority. Following this principle, the data from the logical channel of the highest priority is the first to be included into the MAC PDU, followed by data from the logical channel of the next highest priority, continuing until the MAC PDU size allocated by the eNB is completely filled or until there is no more data to transmit.

The radio resource control (RRC) protocol controls the scheduling of uplink data by signalling for each logical channel the following parameters:

priority where an increasing priority value indicates a lower priority level of the related logical channel;

prioritisedBitRate which sets the prioritized bit rate (PBR); and bucketSizeDuration which sets the bucket size duration (BSD).

The UE shall maintain a variable Bj for each logical channel j. Bj (measured in number of bits) shall be initialized to zero when the related logical channel is established, and incremented by the product PBR×TTI duration for each TTI, where PBR is prioritized bit rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

Although this kind of priority-based multiplexing is simple and favours the highest priorities, it sometimes leads to starvation of low-priority bearers. Starvation occurs when the logical channels of the lower priority cannot transmit any data because the data from higher priority logical channels always takes up all the allocated radio resources.

To avoid starvation, while still serving the logical channels according to their priorities, in 4G LTE a prioritized bit rate (PBR) is configured by the eNB for each logical channel. The PBR is the data rate provided to one logical channel before allocating any resource to a lower-priority logical channel.

In order to take into account both the PBR and the priority, each logical channel is served in decreasing order of priority, but the amount of data from each logical channel included into the MAC PDU is initially limited to the amount corresponding to the configured PBR. Only when all logical channels have been served up to their PBR, then if there is still room left in the MAC PDU each logical channel is served again in decreasing order of priority.

In this second round, each logical channel is served only if all logical channels of higher priority have no more data for transmission.

In most cases, a MAC CE has higher priority than any other logical channel because it controls the operation of a MAC entity. Thus, when a MAC PDU is composed and there is a MAC CE to send, the MAC CE is included first and the remaining space is used to include data from logical channels. One exception to this rule occurs when a UE transmits the first RRC message to a target cell during a handover procedure—in this case, a MAC CE such as a BSR has lower priority than the SRB that is used for this RRC message. This is because it is more important to complete the handover procedure as soon as possible than to inform the eNB of the UE's buffer status; otherwise, the data transfer interruption time would be longer, and the probability of handover failure would increase due to the delayed signalling.

When a new uplink transmission is prepared, the UE shall allocate resources to the logical channels according to the following steps:

Step 1: All the logical channels with $B_j>0$ are allocated resources in a decreasing priority order. If the PBR of a radio bearer is set to "infinity", the UE shall allocate resources for all the data that is available for transmission on the RB before meeting the PBR of the lower priority RB(s).

Step 2: The UE shall decrement $B_j$ by the total size of MAC SDUs served to logical channel j in Step 1. (Note: The value of $B_j$ can be negative.)

Step 3: If any resources remain, all the logical channels are served in a strict decreasing priority order (regardless of the value of $B_j$ until either the data for that logical channel or the UL grant is exhausted, whichever comes first. Logical channels configured with equal priority should be served equally.

While performing the steps 1 through 3 above, the UE shall also follow the rules below:

The UE should not segment an RLC SDU (or partially transmitted SDU or retransmitted RLC PDU) if the whole SDU (or partially transmitted SDU or retransmitted RLC PDU) fits into the remaining resources.

If the UE segments an RLC SDU from the logical channel, it shall maximize the size of the segment to fill the grant as much as possible.

The UE should maximise the transmission of data.

The UE shall not transmit data for a logical channel corresponding to a radio bearer that is suspended.

The UE shall take into account the following relative priority in decreasing order:

MAC CE for C-RNTI or data from UL-CCCH;

MAC CE for BSR, with exception of BSR included for padding;

MAC CE for PHR;

Data from any logical channel, except data from UL-CCCH;

MAC CE for BSR included for padding.

In the following example we consider radio access technology (RAT) of type A, which may be 4G LTE. For RAT-A we have three logical channels (LC-A.1 to LC-A.3) with three different priorities. First, LC-A.1 is served up to the number of bits calculated from PBR-A.1 (for example: PBR'time interval since last transmission), then LC-A.2 is served up to its number of bits according to PBR-A.2 and then LC-A.3 with as much data as is available (since in this example the amount of data available is less than what would be permitted by the number of bits according to PBR-A.3 configured for the buffer of that logical channel). After that, the remaining space in the MAC PDU is filled with data from LC-A.1 which is of the highest priority until there is no further room in the MAC PDU (or until there is no further data from LC-A.1). If there is still a room in the MAC PDU after serving LC-A.1, then LC-A.2 is served in a similar way. FIG. 2 shows the details of this procedure.

The bandwidth adaptation (BA) concept in 5G NR enables adjustment of the receive and transmit bandwidth of a UE. That means, neither a UE's receive nor its transmit bandwidth needs to be as large as the total bandwidth of the cell. In fact, the width of the frequency range can be ordered to change during operation (e.g. to shrink during period of low activity to save power); the location can move in the frequency domain (e.g. to increase scheduling flexibility); and the subcarrier spacing can be ordered to change (e.g. to allow different services). A subset of the total bandwidth of a cell is referred to as a bandwidth part (BWP) and BA is achieved by configuring the UE with BWP(s) and telling the UE which of the configured BWPs is currently the active one.

FIG. 3 describes a scenario (taken from 3GPP TS 38.300) where three different BWPs with different numerology are configured:

BWP1 with a width of 40 MHz and subcarrier spacing of 15 kHz;

BWP2 with a width of 10 MHz and subcarrier spacing of 15 kHz;

BWP3 with a width of 20 MHz and subcarrier spacing of 60 kHz.

The known arrangements suffer from certain deficiencies.

While the global wireless industry is working on preparations to launch the first 5G services, LTE subscriptions are still growing at a fantastic rate. Thus, many mobile network operators (MNOs) are still improving their LTE service offerings. That means the deployment of LTE networks continues as well as technology upgrades from LTE to LTE-Advanced are being performed.

As LTE has been heavily deployed and operates in frequency bands with excellent propagation properties, MNOs cannot easily give up on their LTE investments. In other words, LTE will remain in the market and serve billions of subscribers worldwide for many years to come.

From 4G LTE role out experience, the proportion of UTRAN (3G UMTS) and E-UTRAN (4G LTE) collocated network deployment scenarios is more than 80%. From this figure we can expect that also 5G NR deployments will be collocated with established 4G LTE base stations in many cases.

All existing multi-connectivity solutions (i.e. the various dual-connectivity architecture options according 3GPP TR 38.801 and 3GPP TS 37.340) have certain drawbacks in common: They only support packet exchange based on long-term measurement reports and transmission status reports at PDCP level of the system over a non-ideal backhaul link, such as the X2 interface.

These solutions are not capable of deciding, for each MAC-PDU being created, whether to transmit data from a transmit buffer related to the 4G RAT, or data from a transmit buffer related to the 5G RAT, or from both buffers. This may result in a waste of radio resources and decreased service quality. Bad user experience and less efficient network operation are the consequences.

Because of all this, an even tighter coupling between the two wireless communication systems for higher capacity and lower latency is desirable. In contrast to the various multi-connectivity alternatives defined for 3GPP Rel-15 (for instance, EN-DC and NE-DC), this invention relates to the tight aggregation of 4G LTE and 5G NR at lower layers of the protocol stacks involved.

US 2018/0270700 A1 describes a buffer control mechanism including a buffer status report transmission in respect of one or more logical channels using a buffer status report timer. A gNB allocates resources based on the UE buffer status.

US 2018/0146398 A1 describes the operation of a 5G system including buffer status reporting. MAC sub-header structures are used to provide a high data transmission rate and a low latency.

US 2018/0139646 A1 describes a technique for efficient uplink scheduling using buffer status reporting and logical channel prioritization. A mobile node may use a split bearer split across a master base station and a secondary base station and a buffer status report of a respective PDCP buffer occupancy value is transmitted to each base station.

U.S. Pat. No. 9,942,898 B2 describes an arrangement whereby a plurality of logical channels are configured with one logical channel being restricted to one or more radio resource types. A buffer status report is triggered when data becomes available and a transport block in constructed including the buffer status report.

US 2017/0353972 A1 describes the use of downlink control information with uplink grant information including an indication of a listen-before-talk (LBT) priority class. First uplink resources may be allocated to the one or more first logical channels. Some remaining uplink resources may be allocated to one or more second logical channels of the plurality of logical channels in response to the uplink resources not being exhausted.

EP 2 723 144 A1 describes a technique for sending a joint uplink buffer status report (BSR) by a UE wishing to transmit using a radio bearer carried by more than one radio access technology simultaneously. Resources for both RATs are then scheduled based on the joint BSR. The joint BSR contains for each RAT a RAT ID and a BSR for that RAT.

US 2012/0140743 A1 describes the use of two radio access technologies with a primary channel being associated with a first RAT and a supplementary channel being associated with a second RAT. The UE receives provisioning information for the supplementary channel over the primary channel. A buffer state report may be transmitted over either RAT.

The present invention provides a method of transmitting data to a receiving entity, the method comprising establishing a plurality of transmission channels to the receiving entity, the transmission channels being established using more than one radio access technology; for each transmission channel determining a buffer status of a data buffer containing data to be transmitted using that transmission channel; and determining if transmission capacity is available in a packet data unit of a first radio access technology and if such transmission capacity is available determining whether data may be taken from a data buffer of a transmission channel of a second radio access technology and transmitted to the receiving entity in the packet data unit.

In an exemplary scenario (downlink), the receiving entity may be a user equipment (UE), such as a mobile phone or a tablet computer. It may be designed to receive data from two (or more) transmitting entities (base stations) in a type of multi-connectivity operation. The base stations involved in this operation may make use of different generations of radio access technologies, such as 4G LTE and 5G NR, and the receiving entity may support both generations. The two (or more) MAC entities on either side of the air interface may be directly interconnected with each another according to the teachings of this invention.

In another exemplary scenario (uplink), the receiving entity may be a set of two (or more) base stations, each of which making use of different generation of radio access technology, such as 4G LTE and 5G NR. The receiving entity may be designed to receive data in a type of multi-connectivity operation from a transmitting entity that may be present in form of a user equipment (UE). The two (or more) MAC entities on either side of the air interface may be directly interconnected with each another according to the teachings of this invention.

Considering the long-term coexistence of 4G LTE and 5G NR, a more efficient aggregation mechanism between these two radio access technologies (RATs) is desirable. This invention enables lower layer interworking of 4G LTE and 5G NR at the MAC layer predominantly for scenarios where both generations of base stations are co-located and thus can be easily interconnected via an (internal or external) interface with high performance and low latency. The tight interworking method at lower layers facilitates fast and efficient selection of resources offered by multiple available RATs for each MAC PDU being constructed for at least one of uplink, downlink, and sidelink data transmissions.

In case of sidelink data transmissions (i.e. direct exchange of data between two UEs) the functionalities described for two interconnected base stations collectively serving a mobile device (UE) could also be deployed in one (or more) of the mobile devices (UEs) involved.

According to a first aspect of the present invention we enable filling of remaining space in MAC PDUs with data taken from buffers of a different RAT: For example, the rest of the payload of an LTE MAC PDU can be filled with data stemming from a buffer belonging to a 5G NR logical channel. Likewise, the rest of the payload of an NR MAC PDU can be filled with data stemming from a buffer belonging to a 4G LTE logical channel.

According to a second aspect of the present invention the priorities of the various logical channels in the different RATs are coordinated across RAT domains.

According to a third aspect of the present invention the resource offerings (e.g., based on configured numerologies and/or selected BWPs) of the physical channels in the different RATs are coordinated across RAT domains.

According to a fourth aspect of the present invention the current performance of the physical channels in the different RATs are taken into account for the interworking across RAT domains. The performance criteria of the physical channels may (for example) be based on (at least one of): resource utilization (such as detected load), data rate (such as measured throughput), indications of listen-before-talk (LBT) mechanisms, detection of radio-link-failure (RLF) events, bit error rate, block error rate, and so on.

According to a fifth aspect of the present invention various placements for an interworking coordination entity (ICE) to realize the functionality outlined above are provided.

The existing multi-connectivity solutions (i.e. the various dual connectivity architecture options according 3GPP TR 38.801 and 3GPP TS 37.340) have certain drawbacks. Decision making is based on long-term measurement reports exchanged at RRC level and transmission of status reports at PDCP level of the system over a non-ideal backhaul link.

The present invention enables interworking between two RATs at lower layers thereby mitigating the deficiencies of prior art. Base stations of 4G LTE (eNB) and 5G NR (gNB) can interconnect with each other at MAC layer for a faster and more efficient exchange of information across RAT domains, for instance pertaining to:

buffers status levels;
logical channels' priorities;
physical channels' resource offerings; and
physical channels' current or predicted (measured or estimated) performance.

All this allows coordinating the filling of remaining payload space in the various MAC PDUs across RAT domains. Flexibility for handling logical channel priorities is increased and the so-called event of "logical channel starvation" is thereby mitigated. Furthermore, the method may in one aspect significantly reduce the latency of data transmissions in case of multi-connectivity according to prior art. The method may enable more efficient use of radio resources and will increased service quality. This would lead to a better user experience and a more efficient network operation.

Embodiments of the invention will now be described, by way of example only, with reference to the accompanying drawings in which.

Figure 7:
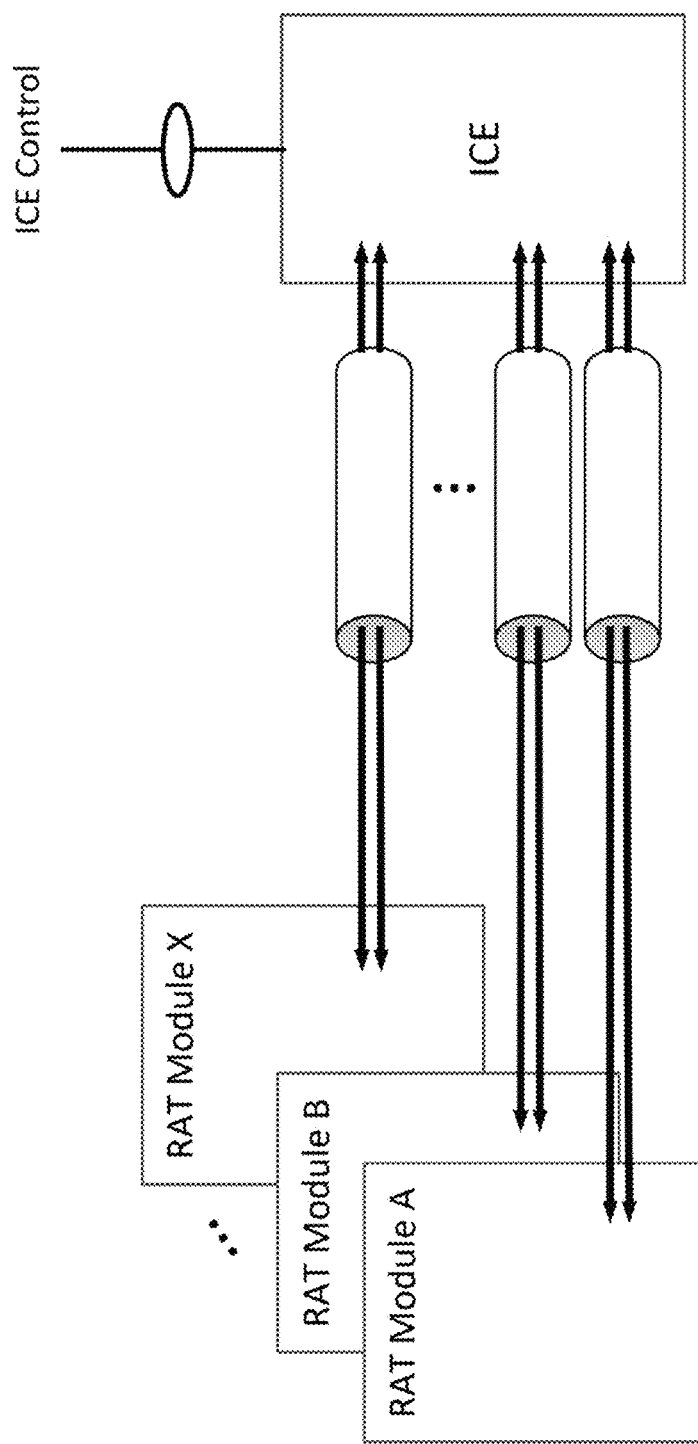

FIG. 7 further illustrates the arrangement according to Example C; and

Figure 8:
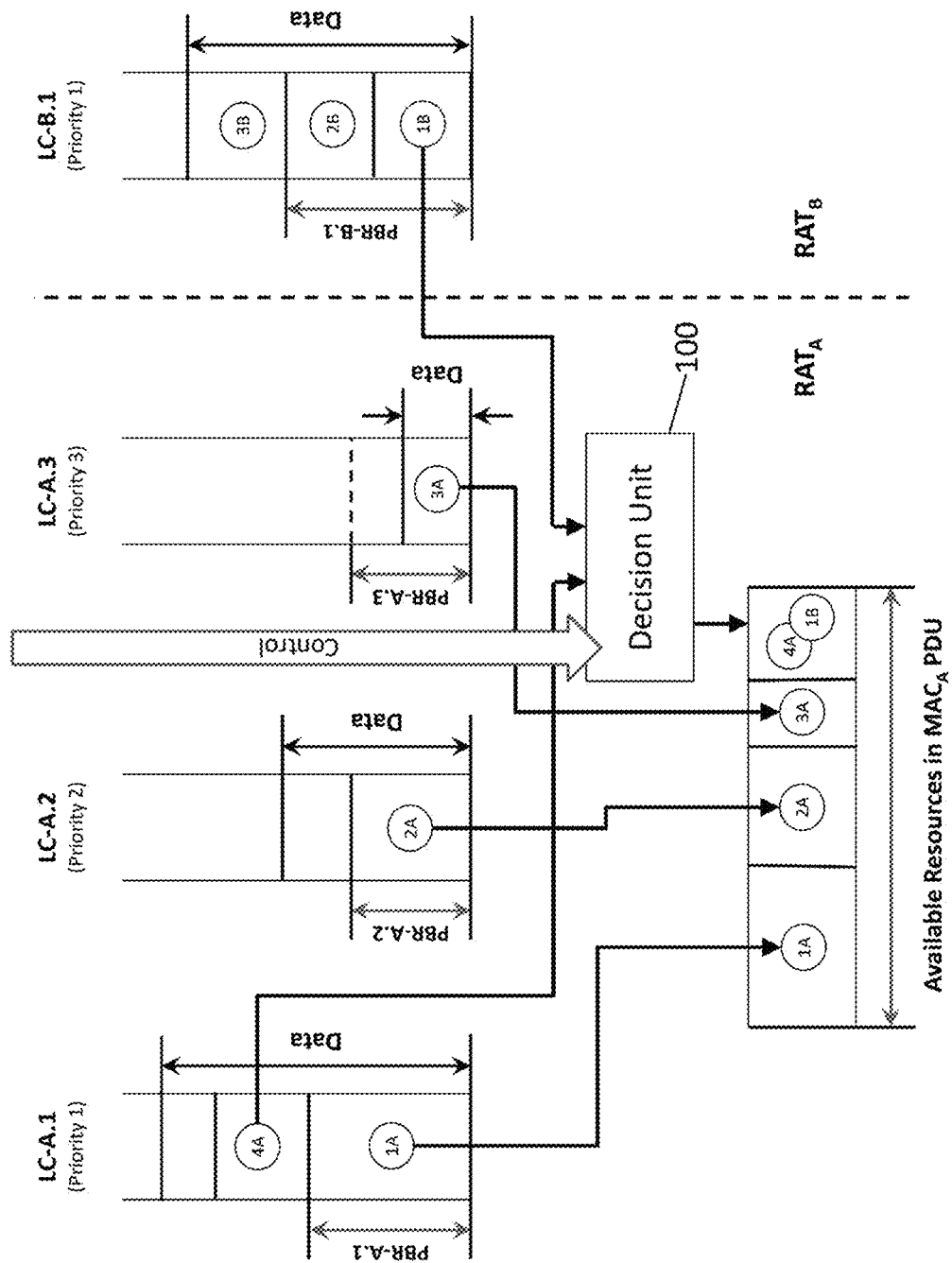

FIG. 8 shows a representation of a MAC PDU and how it may be populated.

In a first embodiment (Examples A and B) we describe a distributed interworking coordination entity (ICE) made up of two sub functions but more sub-functions could be present. For example, a sub function can be placed either in the "logical channel prioritization" (Example A) and/or in the "multiplexing" (Example B) functional block. There may be one sub function per MAC entity. This first embodiment is advantageous when the base stations are co-located and can thus be interconnected via an (internal or external) interface with high performance characteristics (e.g., in terms of high data rate and/or low latency).

In another embodiment we describe a common interworking coordination entity (ICE), which is connected ideally via a high-performance interface to the "logical channel prioritization" and/or "multiplexing" functional blocks (Example C). This second embodiment is advantageous when there are more than two RATs involved.

We describe three different examples for the implementation of the invention as previously outlined. The related figures show the most general multi-connectivity configuration with a master cell group (MCG) offered by a master node (MN) and a secondary cell group (SCG) offered by a secondary node (SN). For example, the MN may be a 4G LTE base station, and the SN may be a 5G NR base station offering physical layer configurations that are much more flexible (e.g., in terms of bandwidth adaptation, BWP location within the cell bandwidth, symbol length, sub carrier spacing, etc.) than those of 4G LTE. In some scenarios either the MN or the SN (or both) may be configured to offer only a single cell (rather than a cell group).

Example A illustrates a distributed interworking coordination entity (ICE) residing in a "logical channel prioritization" building block.

Figure 1:
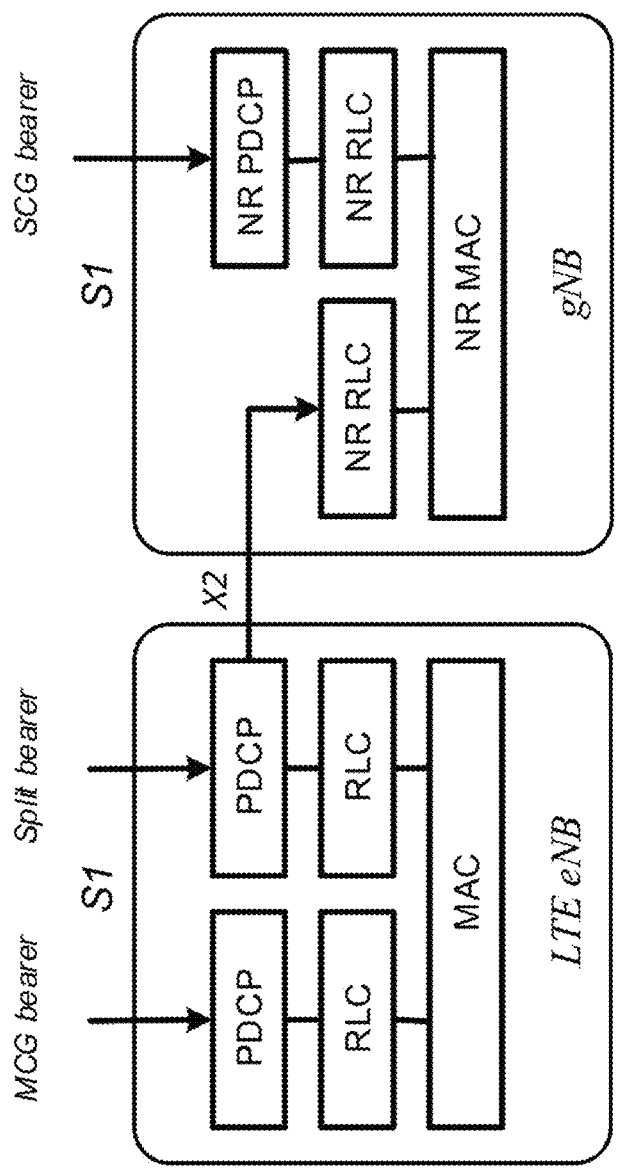
FIG. 1 shows a schematic representation of a dual connectivity arrangement.
Figure 2:
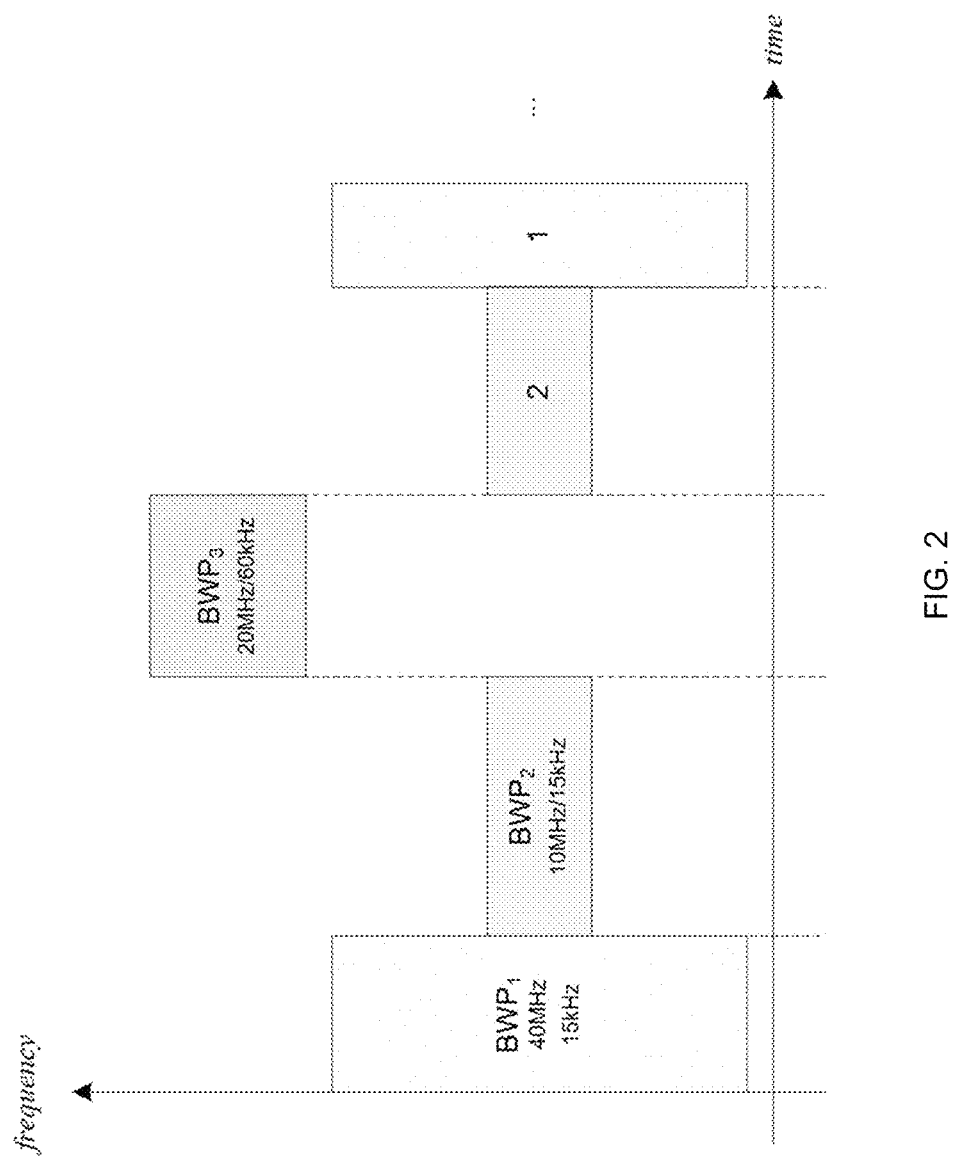
FIG. 2 is a representation of a PDU filled from multiple buffers.
Figure 3:
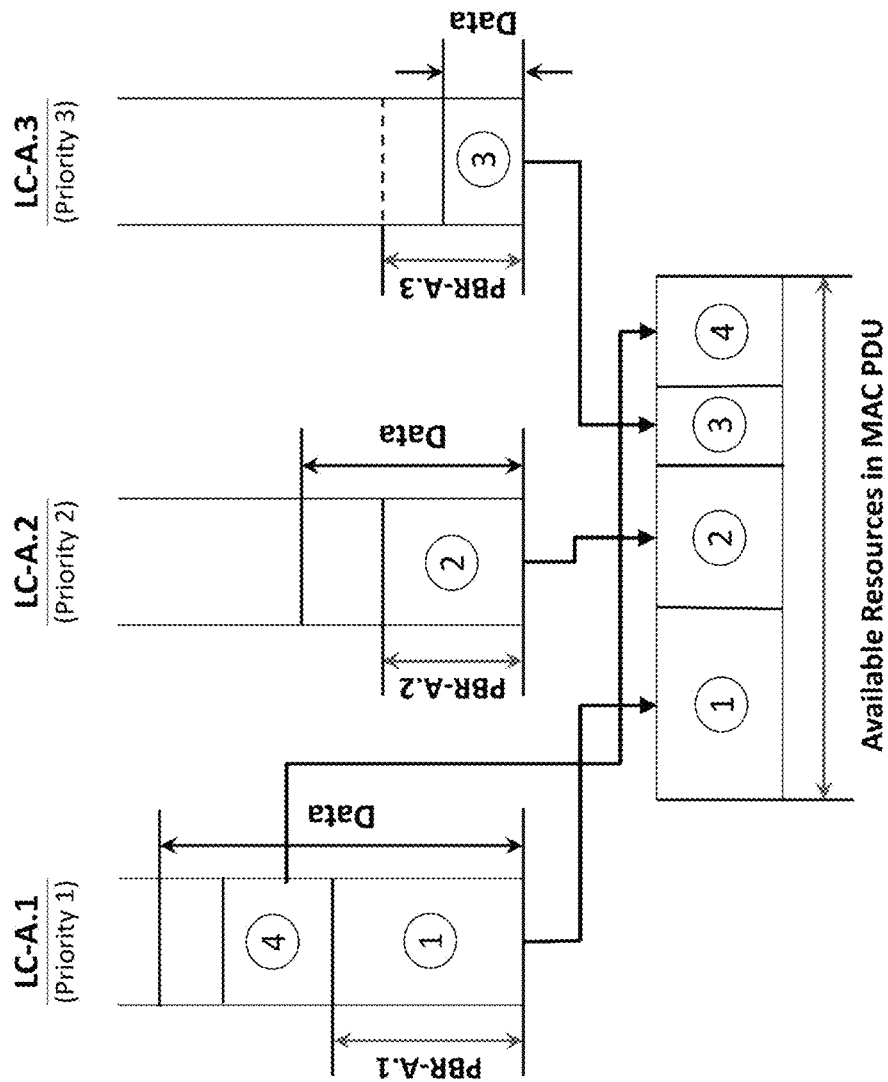
FIG. 3 shows bandwidth adaptation in a 5G NR communication system.
Figure 4:
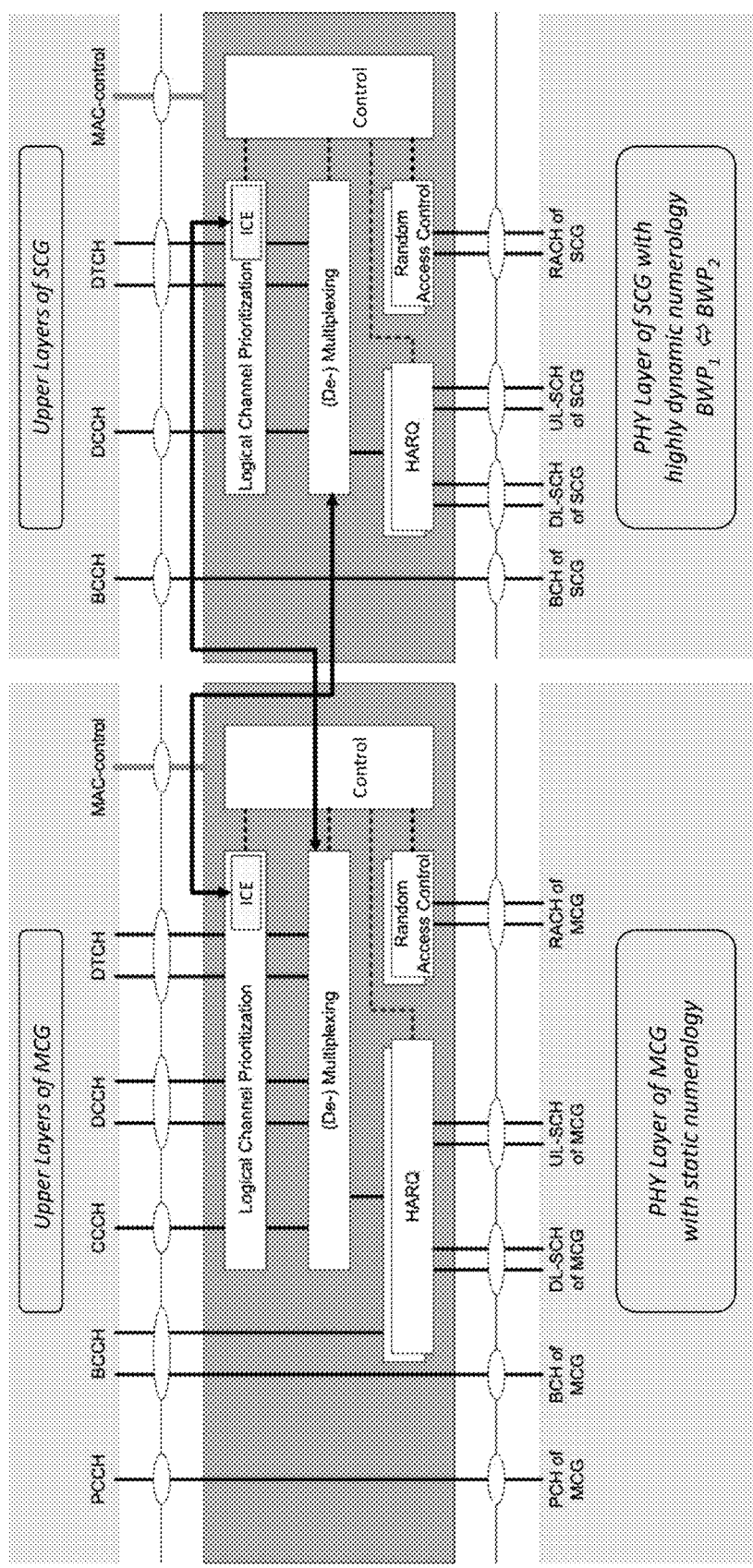
FIG. 4 shows interworking at the MAC layer according to Example A.

In the embodiment according to Example A shown in FIG. 4 at least one of the involved MAC entities contains an ICE as part of a Logical Channel Prioritization function. The tasks of an ICE may comprise at least one of the following:

Determining which and how much data waiting in buffers associated with logical channels of the respective node is suited (e.g., based on logical channel priority, PHY performance on the other side, and so on) to be handed over to MAC PDUs being constructed in the other node(s).

Querying the Multiplexing functions of the other node(s) about availability of payload space.

Querying the MAC entity of the other node(s) about physical layer performance (e.g., in terms of load, bandwidth configuration (BWP), throughput, transmission opportunities based on listen-before-talk (LBT), error rate, and so on).

Informing the other node(s) about data being classified as suitable for handover to MAC PDUs being constructed in the other node(s).

Coordinating/mapping QoS classes among the different RATs involved.

Selecting data for transfer to other node(s).

Tagging selected data, e.g. with an identifier that allows association of the data with its source RAT and/or its source logical channel after transmission over the air.

Transferring selected data to the other node(s), if there is sufficient space left in the payload of said MAC PDUs.

This list is not comprehensive, and the order of the tasks listed above may also vary. Furthermore, not all tasks from the list have to be performed necessarily in all scenarios.

Example B illustrates a distributed interworking coordination entity (ICE) residing in a "multiplexing" building block.

Figure 5:
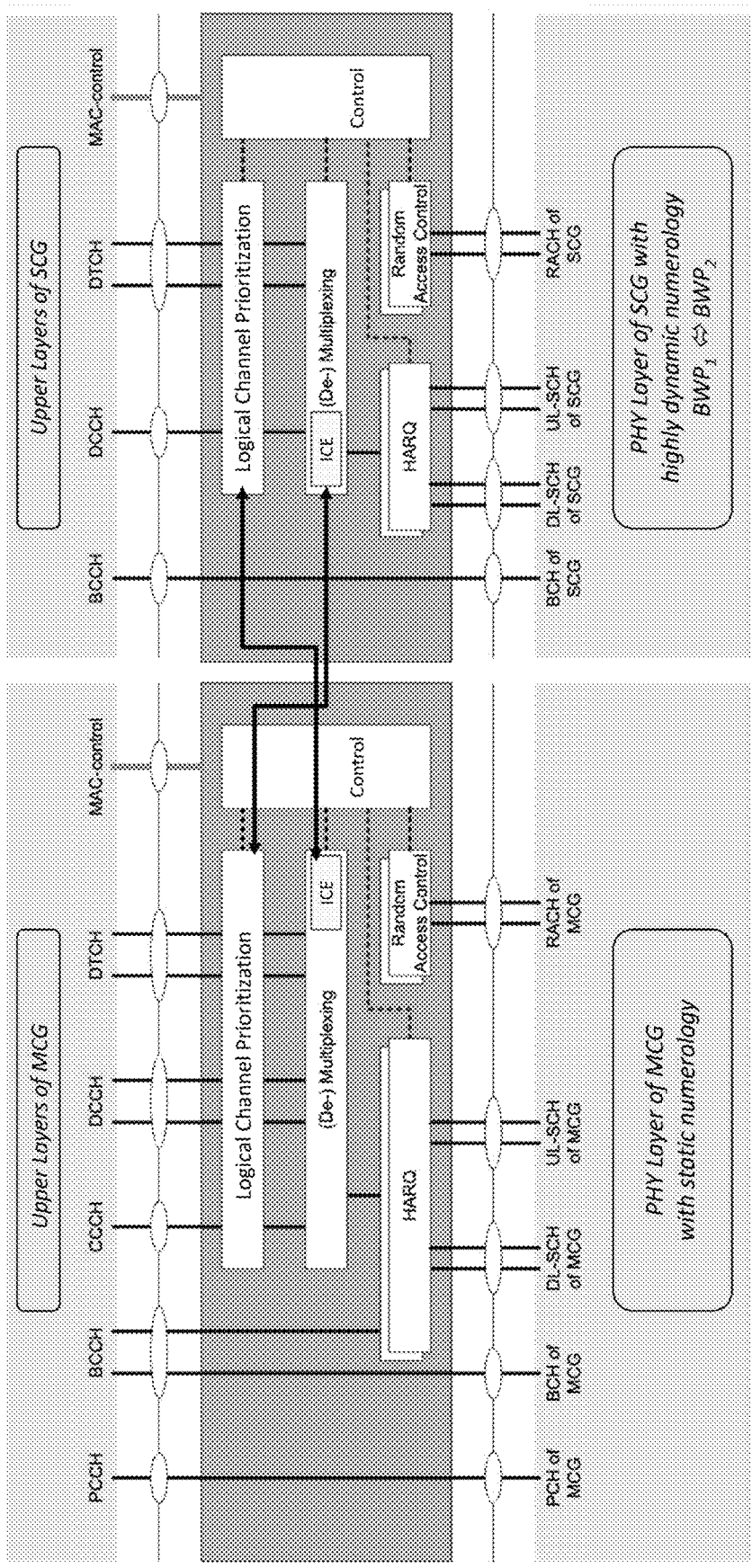
FIG. 5 shows interworking at the MAC layer according to Example B.

In the embodiment according to Example B as shown in FIG. 5 at least one of the involved MAC entities contains an ICE as part of a multiplexing function. In this case, the tasks of an ICE may comprise at least one of the following:

Determining the physical layer performance (e.g., in terms of load, bandwidth configuration (BWP), throughput, transmission opportunities based on listen-before-talk (LBT), error rate, and so on) of the same node.

Determining how much payload of a MAC PDU being constructed is suited to be filled with data from buffers associated with logical channels of other node(s).

Informing the other node(s) about this suitability.

Querying the logical channel prioritization functions of other node(s) about availability of data (including QoS demands, amount of data, logical channel priorities, and so on).

Selectively requesting data from certain buffers of other node(s), if sufficient payload is available in the MAC PDU being constructed and the PHY is deemed suitable to transport said data.

Coordinating/mapping QoS classes among the different RATs involved.

Tagging data retrieved from buffers of other node(s), e.g. with an identifier that allows association of the data with its source RAT and/or its source logical channel after transmission over the air.

Including data retrieved from buffers of other node(s) in the respective MAC PDU.

This list is not comprehensive, and the order of the tasks listed above may also vary. Furthermore, not all tasks from the list have to be performed necessarily in all scenarios.

Example C illustrates a common interworking coordination entity (ICE) connected to the MAC entities involved.

Figure 6:
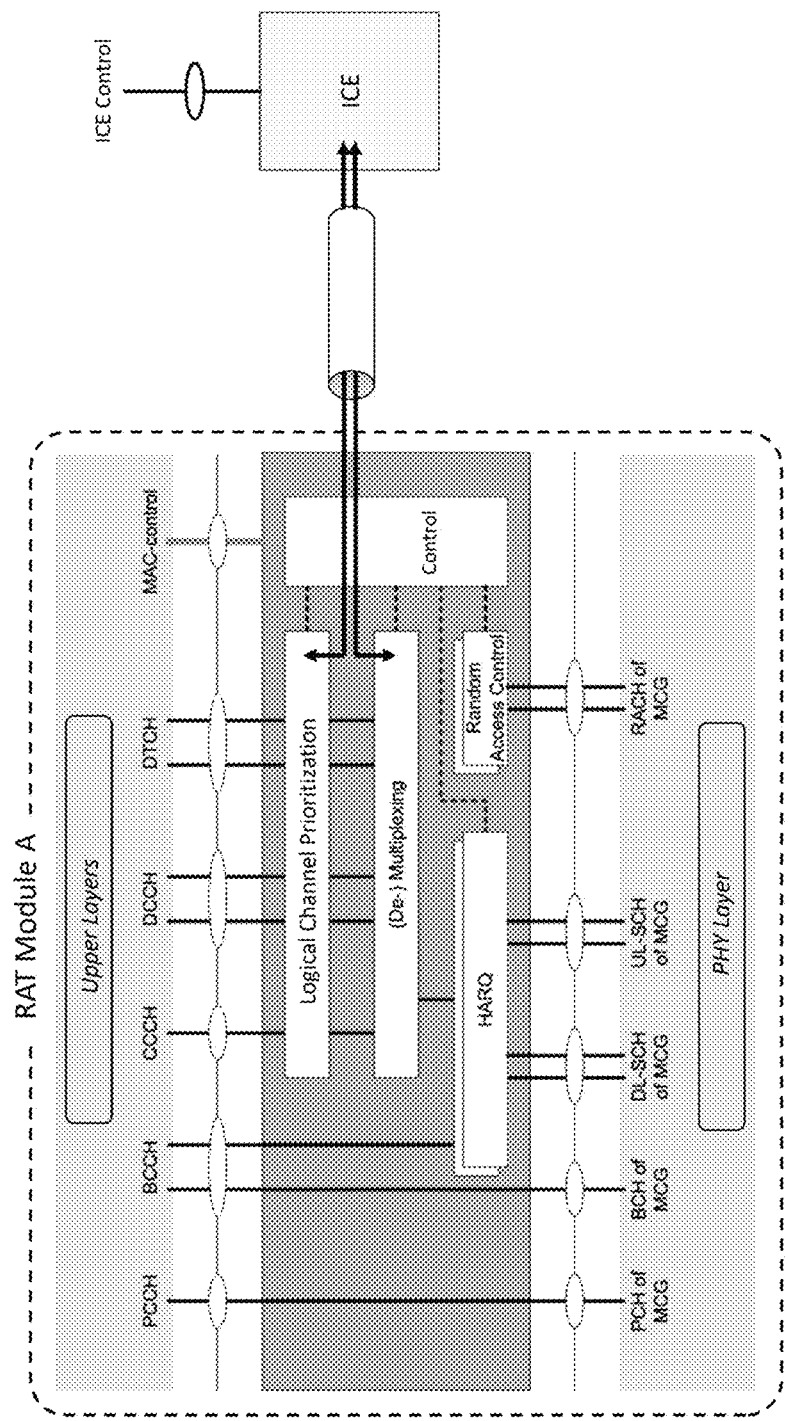
FIG. 6 shows interworking at the MAC layer according to Example C.

In the embodiment according to Example C shown in FIG. 6 all involved RAT modules are connected to a common ICE that may be centrally located. There may be two logical connections between the ICE and every RAT module of interest. For instance, one of these connections may link the ICE with the multiplexing function and one connection may link the ICE with the logical channel priority function. The multiplexing functions and the logical channel priority functions may but don't necessarily have to be located inside the MAC layer of the respective protocol stack. FIG. 6 depicts a simplification with only one RAT module shown. In some scenarios, there may be more than one RAT Module connected to a common ICE as depicted in FIG. 7 (ranging from RAT module A through RAT module X).

The common ICE may have a further service access point (SAP) that can be used to exchange information and control commands with the RRC layer of (at least one of) the communication system(s), which is not shown for sake of brevity.

The tasks of the ICE in such a set-up may be a combination of the tasks listed above. That means, the ICE would be responsible for:

Determining the various physical layers' performances (e.g., in terms of load, bandwidth configuration (BWP), throughput, transmission opportunities based on listen-before-talk (LBT), error rate, and so on).

Determining how much payload of the various MAC PDUs being constructed is suited to be filled with data stemming from buffers associated with logical channels of other nodes.

Informing the other nodes about this suitability.

Querying the logical channel prioritization functions of other nodes about availability of data (including QoS demands, amount of data, logical channel priorities, and so on).

Selectively requesting data from certain buffers of certain other nodes, if sufficient payload is available in the MAC PDUs being composed and the respective PHY is deemed suitable to the transport of said data.

Coordinating/mapping QoS classes among the different RATs involved.

Tagging data retrieved from buffers, e.g. with an identifier that allows association of the data with its source RAT and/or its source logical channel after transmission over the air.

Forwarding data retrieved from buffers of other nodes to the respective multiplexing functions in selected nodes.

This list is not comprehensive, and the order of the tasks listed above may also vary. Furthermore, not all tasks from the list have to be performed necessarily in all scenarios.

Association of data with a source RAT or a source logical channel may comprise mapping of data to the source RAT and/or the source logical channel in the receiving entity after transmission over the air. The identifier used for this is preferably unambiguous across RATs and logical channels. It may be used, on the receiving side, to transfer data stemming from a particular logical channel from one MAC entity to another MAC entity.

FIG. 8 shows an example MAC PDU (here, constructed in the domain of RAT-A) and how it can be filled with data taken from various buffers that are associated with logical channels across RAT domains. Here, data is taken from two RAT domains: RAT-A and RAT-B. In principle, it is possible to take data from buffers of logical channels from more than two RAT domains.

RAT-A may be 4G LTE and may have three logical channels (LC-A.1 to LC-A.3) with three different priorities. There is also RAT-B which may be 5G NR. For RAT-B only one buffer associated with logical channel LC-B.1 is shown; it has priority in this example. It has to be noted, that the meaning of the priorities is in general not the same between RAT-A and RAT-B. Therefore, a mapping table is required, as described below. In the domain of RAT-B, there may be more buffers associated with further logical channels LC-B.x, but these are not shown in FIG. 8 for the sake of brevity.

Before MAC SDU are integrated into the payload of a MAC PDU, a check is performed by a decision unit 100. The decision unit 100 may be part of or connected to the interworking coordination entity (ICE) (not shown). Thus, it may be located in (or, associated with) the multiplexing function in the MAC layer of RAT-A.

First, LC-A.1 is served up to its number of bits according to PBR-A.1, then LC-A.2 is served up to its number of bits according to PBR-A.2 and then LC-A.3 is served with as much data as is available (since in this example the amount of data available is less than what would be permitted by the PBR-A.3 configured for the buffer of that logical channel).

According to the present invention, the decision unit 100 may then determine the remaining space in the MAC PDU and/or the resource offerings of RAT-A (e.g., numerologies of active and/or configured BWPs) and/or performance criteria of the physical channels. Further, the decision unit 100 may then also determine (e.g., based on QoS parameters and/or assigned priorities) which other data in logical channels of the RAT-B domain are suitable for being handed over across the different RAT domains at MAC layer for transmission over physical channels associated with RAT-A. For example, the decision unit 100 may base its decisions on at least one item from the following list of items: resource utilization (load), data rate (throughput), listen-before-talk indications, radio-link-failure (RLF) events, bit error rate, block error rate, and so on). In this example, the decision unit 100 may conclude that at this point in time data from LC-B.1 (which has highest priority in the RAT-B domain) is well suited for being transported over RAT-A (maybe because of the data rate currently offered by RAT-A).

Hence, the remaining space in the MAC PDU (i.e. the payload size not yet used) is filled with data from LC-B.1 which is of the highest priority in the RAT-B domain until there is no further room in the MAC PDU (or until there is no further data from LC-B.1). According to the above, the order of MAC SDUs in the payload of the MAC PDU is as follows: 1A, 2A, 3A, 1B.

If there is still a room in the MAC PDU after serving LC-B.1, then either further logical channels LC-B.x of the RAT-B domain could be served, or the decision unit 100 switches back to the RAT-A domain in order to serve logical channels of the RAT-A domain in a second round. Which way to proceed may be configurable.

The decision unit 100 may therefore (optionally) receive configuration data over a control interface from the ICE or directly from one of the RRC entities via a dedicated SAP.

In case the decision unit 100 is configured to switch back to the RAT-A domain, the order of MAC SDUs in the payload of the MAC PDU may look like: 1A, 2A, 3A, 1B, 1A, 2A, and so on.

In case the decision unit 100 is configured to remain in the RAT-B domain, the order of MAC SDUs in the payload of the MAC PDU may look like: 1A, 2A, 3A, 1B, 2B, 3B, and so on.

For the buffer associated with logical channel LC-B.1 this means, that once data portion 1B is taken out of the buffer, the data portions 2B and 3B "slide down" into a new position and can be handled as soon a new MAC PDU becomes available in the RAT-B domain (or across the RATs, when a new MAC PDU becomes available again in the RAT-A domain).

This shows, that it may be beneficial to configure each logical channel with more than just one prioritized bit rate (PBR). In fact, it is one aspect of the present invention (cf. second aspect) to configure logical channels with two (or more) prioritized bit rates (PBRs), one for each RAT-module if interworking across RAT domains at MAC layer is desired (configured).

For example, the buffer associated with logical channel LC-B.1 may be configured with PRB-B.1 for MAC PDUs created in the domain of RAT-B (as shown in FIG. 8) and yet another (potentially different) PBR for MAC PDUs created in another RAT domain.

In a further configuration example, the decision unit 100 has obtained global logical channel priorities (GLCPs), that are valid for both RATs (e.g. by using a mapping table, as shown below). In this case, the order of MAC SDUs (bits taken from the various buffers) is strictly taken from this list of these global priorities, irrespective of the type of RAT. In one example (cf. Table 1 below), this may mean an order of 1B(1'), 1A(2'), 2A and 2B (both 3'), 3A and 2B (both 4') and so on (the '-sign indicates the values of the GLCPs).

In order for this method to work properly, the ICE may have to coordinate the various QoS demands/logical channel priorities with the performance offerings/capabilities of the various physical layers. An exemplary mapping is given in Table 1.

TABLE 1

| | RAT A (e.g. 4G LTE) | | RAT B (e.g., 5G NR) | |
|---|---|---|---|---|
| Global Priority | Local Priority | Example Service Requirements | Local Priority | Example Service Requirements |
| 1' | — | n.a. | 1 | delay tolerance: no data rate: high |
| 2' | 1 | delay tolerance: no data rate: low | — | n.a. |
| 3' | 2 | delay tolerance: yes data rate: low reliability: high | 2 | delay tolerance: no reliability: high |
| 4' | 3 | delay tolerance: yes data rate: medium | 2 | delay tolerance: no reliability: medium |
| 5' | 4 | delay tolerance: medium data rate: medium reliability: high | 3 | delay tolerance: yes |
| 6' | 5 | delay tolerance: low data rate: low reliability: medium | 4 | delay tolerance: low data rate: low reliability: medium |
| 7' | — | n.a. | 5 | delay tolerance: low data rate: low reliability: low |

The invention claimed is:

1. A method of transmitting data to a receiving entity, the method comprising:
   establishing a plurality of transmission channels to the receiving entity, the transmission channels being established using more than one radio access technology;
   for each transmission channel determining a buffer status of a data buffer containing data to be transmitted using that transmission channel; and
   determining if transmission capacity is available in a packet data unit of a first radio access technology and if such transmission capacity is available determining whether data may be taken from a data buffer of a transmission channel of a second radio access technology and transmitted to the receiving entity in the packet data unit.

2. The method according to claim 1, wherein the determining whether data from the data buffer of the transmission channel of the second radio access technology should be transmitted to the receiving entity in the packet data unit is performed using at least one of buffer status information, logical channel priority information, and physical layer transmission performance information.

3. The method according to claim 2, wherein a decision unit receives priority information of data units stored in one or more data buffers of a transmission entity operating using the first radio access technology and priority information of data units stored in one or more data buffers of a transmission entity operating using the second radio access technology and determines a transmission scheme for packet data to be transmitted using the first radio access technology from the received priority information.

4. The method according to claim 2, wherein an interworking coordination entity coordinates a transfer of data to be transmitted to the receiving entity between a transmission entity operating using the first radio access technology and a transmission entity operating using the second radio access technology.

5. The method according to claim 1, wherein a decision unit receives priority information of data units stored in one or more data buffers of a transmission entity operating using the first radio access technology and priority information of data units stored in one or more data buffers of a transmission entity operating using the second radio access technology and determines a transmission scheme for packet data to be transmitted using the first radio access technology from the received priority information.

6. The method according to any preceding claim 1, wherein an interworking coordination entity coordinates a transfer of data to be transmitted to the receiving entity between a transmission entity operating using the first radio access technology and a transmission entity operating using the second radio access technology.

7. The method according to claim 6, wherein the interworking coordination entity is distributed across the two transmission entities.

8. The method according to claim 7, wherein the interworking coordination entity is logically located as part of a logical channel prioritization function and performs at least one of:
   determining which data is to be transferred from one transmission entity to the other for transmission in the packet data unit;
   ascertaining a multiplexing function of the transmission entities;
   obtaining information about physical layer transmission performance of each transmission entity;
   providing information between transmission entities relating to a suitability of data stored in a buffer of one transmission entity for transmission in the other;
   coordinating quality of service classes between the different radio access technologies;
   selecting data for transfer to the other transmission entity;
   tagging selected data with an identifier that allows association of the data after transmission over the air; and
   transferring data from one transmission entity to the other transmission entity for transmission in the packet data unit.

9. The method according to claim 8, wherein association of data comprises mapping of data to at least one of its source radio access technology and its source transmission channel in the receiving entity.

10. The method according to claim 9, wherein one of the radio access technologies is 3GPP 4G LTE radio access technology and the other radio access technology is 3GPP 5G NR radio access technology.

11. The method according to claim 9, wherein the first and second transmission entities are co-located.

12. The method according to claim 9, wherein at least one of an interworking coordination entity and a decision unit are located in a medium access control layer of a respective radio access technology.

13. The method according to claim 7, wherein the interworking coordination entity is logically located as part of a multiplexing function and performs at least one of:
   obtaining information about physical layer transmission performance of each transmission entity;
   coordinating quality of service classes between the different radio access technologies;
   determining how much payload of a packet data unit being constructed for transmission by one transmission entity is suitable for filling with data from the other transmission entity and informing the other transmission entity of this;
   obtaining information from logical channel prioritization functions about data availability;
   requesting data stored in the data buffer of one transmission entity for transmission by the other transmission entity;
   tagging data retrieved from data buffers of other transmission entities with an identifier that allows association of the data after transmission over the air; and
   including data received from one transmission entity for transmission in a data packet unit for transmission by the other transmission entity.

14. The method according to claim 13, wherein association of data comprises mapping of data to at least one of its source radio access technology and its source transmission channel in the receiving entity.

15. The method according to claim 6, wherein the interworking coordination entity is connected to both the transmission entities.

16. The method according to claim 15, wherein the interworking coordination entity performs at least one of:
   obtaining information about physical layer transmission performance of each transmission entity;
   determining how much payload of a packet data unit being constructed for transmission by one transmission entity is suitable for filling with data from the other transmission entity and informing the other transmission entity of this;
   obtaining information from logical channel prioritization functions about data availability;
   requesting data stored in a buffer of one transmission entity for transferral to the other transmission entity for transmission by the other transmission entity;
   coordinating quality of service classes between the different radio access technologies;
   tagging data retrieved from buffers with an identifier that allows association of the data after transmission over the air; and
   forwarding data received from one transmission entity to the other transmission entity.

17. The method according to claim 16, wherein association of data comprises mapping of data to at least one of its source radio access technology and its source transmission channel in the receiving entity.

18. The method according to claim 1, wherein one of the radio access technologies is 3GPP 4G LTE radio access technology and the other radio access technology is 3GPP 5G NR radio access technology.

19. The method according to claim 1, wherein the first and second transmission entities are co-located.

20. The method according to claim 1, wherein at least one of an interworking coordination entity and a decision unit are located in a medium access control layer of a respective radio access technology.

* * * * *